Patented Dec. 29, 1931

1,838,587

UNITED STATES PATENT OFFICE

FREDERICK W. SPERR, JR., OF PITTSBURGH, PENNSYLVANIA, ASSIGNOR TO THE KOPPERS COMPANY, A CORPORATION OF DELAWARE

PROCESS OF DISTILLING AMMONIACAL LIQUORS

No Drawing. Application filed February 23, 1927. Serial No. 170,420.

This invention relates to the distillation of complex ammoniacal liquors for the recovery of ammonia therefrom and also to such processes as depend wholly or in part upon such distillation step,—for example, the working up of gas liquor and the well-known ammonia-soda process.

An object of my invention is to provide a process of liberating ammonia from liquors containing ammonia partially or wholly in the form of fixed compounds, and in which the liberation may be effected by means of an inexpensive agent and in substantially a single operation.

My invention has for further objects such other operative advantages or results as may hereinafter be found to obtain.

In order that my invention may be clearly set forth and understood, I will now describe a preferred embodiment with particular reference to the well-known ammonia soda process, in which process sodium bicarbonate and soda carbonate are produced as follows:

I. A solution of common salt is treated with ammonia and carbon dioxide according to the following reaction $$NaCl + NH_3 + CO_2 + H_2O = NaHCO_3 + NH_4Cl$$

II. The sodium bicarbonate is separated out in solid form and recovered by filtration. It is then heated, producing carbon dioxide, water, and sodium carbonate as follows:

$$2NaHCO_3 = Na_2CO_3 + CO_2 + H_2O$$

The carbon dioxide resulting from the above reaction is utilized with ammonia for the treatment of further amounts of brine, as according to (I).

III. The ammonium chloride solution resulting from (I) is distilled with milk of lime, thus $$2NH_4Cl + Ca(OH)_2 = CaCl_2 + 2NH_3 + 2H_2O$$

In this manner, ammonia is recovered for utilization in (I).

IV. The preparation of milk of lime is generally carried out by roasting limestone and slaking the resulting quicklime with water, thus a. $CaCO_3 = CaO + CO_2$
b. $CaO + H_2O = Ca(OH)_2$ The carbon dioxide produced in (IV—a) is utilized in reaction (I) for the treatment of the original brine.

I have discovered that the alkaline earth metal carbonates, such as calcium carbonate, magnesium carbonate, and the like, and other metal carbonates, such as zinc carbonate, under the proper conditions of temperature and pressure, serve as very effective agents for the decomposition of fixed ammonia salts, such, for example, as ammonium chloride. The reaction proceeds as follows:

$$CaCO_3 + 2NH_4Cl = CaCl_2 + CO_2 + 2NH_3 + H_2O$$

It will be noted that carbon dioxide water and ammonia are produced from the decomposition of the alkaline earth metal carbonate and the ammonium chloride. These may be utilized in reaction (I) above and, for this reason, reactions (IV—a) and (IV—b) may be dispensed with. In carrying out my process, I prefer to use the alkaline earth metal carbonates in natural form, such as limestone, chalk or the like. The material is preferably pulverized and added in 10% to 30% excess above the theoretical amount required, to the ammonium chloride solution. The mixture is then steam distilled at a temperature preferably not less than 230° F., and corresponding to a pressure of at least 20 pounds per square inch above atmospheric.

I may employ higher temperatures and higher pressures, but I have found that such are not attended with any corresponding increase of efficiency, but, on the other hand, any marked lowering of temperature and pressure below the preferred range results in a substantial lowering of the rate of reaction.

The ammonium chloride solution is steam distilled with the excess of pulverized limestone or the like in a still preferably equipped with a dephlegmator, the pressure of distillation being so controlled as to be maintained at not less than 20 pounds square inch gauge pressure. The dephlegmator is preferably operated to return to the still all water in excess of that required to prevent ammonium carbonate from depositing in solid form in the vapor outlet.

I may use any alkaline earth metal carbonate alone, but I have found that mixtures of two or more alkaline earth metal carbonates have certain advantages. For example, when calcium carbonate is employed, the evolution of ammonia from the liquor proceeds somewhat more slowly at first and more rapidly in the later stages of distillation, while, in the presence of magnesium carbonate, the evolution of ammonia proceeds relatively rapidly at first and more slowly towards the end of distillation. A mixture of the two, or a material containing both, such, for example, as dolomite, is, therefore, preferably used to equalize and facilitate the evolution of ammonia during distillation.

While I have described my invention above with relation to the ammonia soda process, it is not limited in application to such process but may be employed wherever it is desired to effect the liberation of the ammonia from a complex ammoniacal liquor containing so-called fixed ammonia compounds.

For example, my invention has a particular application to the distillation of so-called gas liquor produced in the manufacture of coal gas, by-product coking, distillation of shale, and the like. Gas liquor contains ammonia in two classes of compounds; the first comprising the so-called free ammonia compounds, such, for example, as the carbonate, sulphide, and cyanide of ammonia, and the second class comprising the so-called fixed ammonia compounds, such, for example, as the chloride, sulphate, and thiosulphate of ammonia.

Hitherto the industrial treatment of such gas liquor has generally been conducted in two stages. The first stage consisted in the distillation of the free ammonia and the second stage consisted in the distillation of the fixed ammonia accomplished by distillation in the presence of lime. It has not been found practicable to add lime to gas liquor directly and to conduct the distillation in a single stage, because, in such practice, a large amount of valuable lime is consumed by reactions with the free ammonia compounds, resulting in the formation of calcium carbonate, calcium sulphide, and the like, which are inert and of no value under ordinary conditions of ammonia liquor distillation.

In applying the process of my invention to the distillation of gas liquor, I may use calcium carbonate, magnesium carbonate, dolomite or the like, as substitutes for lime in the second stage of the ordinary method, but I prefer to employ a single stage process in which these materials are added directly in pulverized form to a gas liquor, the mixture being distilled in a single stage operation under a pressure of at least about 20 pounds per square inch gauge. This distillation may be conducted either continuously or intermittently. I have found that there is substantially no reaction between the alkaline earth metal carbonates and the free ammonia compounds such as, for example, ammonium carbonate when the process is conducted in this manner, and that the free ammonia distills off without loss. This process may be conducted in greatly simplified apparatus and results in the two-fold saving of this simplification of apparatus and the substitution of the relatively cheap alkaline earth metal carbonates for the lime previously employed.

The process of my invention will be understood with reference to a specific example. Let it be assumed that a gas liquor is to be treated for the removal of ammonia therefrom, and that said gas liquor contains any amount of free ammonia (i. e. ammonia liberated on distillation alone) and three grams per liter of fixed ammonia (i. e. ammonia not liberated by simple steam distillation). Theoretically, 100 gallons of such a liquor will require the addition of 7.45 lbs. of calcium carbonate for distillation of the fixed ammonia, but in practice I prefer to add from about 8.19 lbs. to 9.68 lbs. of calcium carbonate to each 100 gallons of liquor, corresponding to an excess of 10% and an excess of 30% over the theoretical amount required, respectively.

Whether applied to the ammonia soda process or to the distillation of gas liquor or to any other process in which ammonia is to be liberated from a liquor containing fixed ammonia compounds, my process utilizes a relatively cheap agent for the liberation of said ammonia.

My process may be conducted in single stage and in simplified apparatus, as well as providing the various other advantages hereinabove recited with respect to the prior art.

I claim as my invention:—

1. The process of liberating ammonia from a liquor containing fixed ammonia compounds which comprises distilling said liquor at a pressure of at least 20 pounds per square inch above atmospheric pressure in the presence of an alkaline earth metal carbonate.

2. The process of treating ammoniacal gas liquor to recover therefrom ammonia present in both free and fixed form which comprises first adding an alkaline earth metal carbonate thereto and then distilling the liquor under elevated temperature and pressure.

3. The process of treating ammoniacal gas liquor to recover therefrom ammonia present in both free and fixed form which comprises distilling the liquor under elevated pressure and temperature in the presence of a carbonate selected from the group consisting of the carbonates of the alkaline earth metals and zinc carbonate.

4. The process of treating ammoniacal gas liquor to recover therefrom ammonia present in both free and fixed form which comprises first adding calcium carbonate thereto and then distilling the liquor under elevated pressure and temperature.

5. The process of treating ammoniacal gas liquor to recover therefrom ammonia in both free and fixed form which comprises first adding dolomite thereto and then distilling the liquor under elevated pressure and temperature.

6. The process of treating ammoniacal gas liquor to recover therefrom ammonia present in both free and fixed form which comprises first adding thereto a mixture of calcium and magnesium carbonates and then distilling the liquor under elevated pressure and temperature.

7. The process of liberating ammonia from a liquor containing fixed ammonia compounds which comprises distilling said liquor at a pressure of at least about twenty pounds per square inch above atmospheric pressure in the presence of calcium carbonate.

8. The process of liberating ammonia from a liquor containing fixed ammonia compounds which comprises distilling said liquor at a pressure of at least about twenty pounds per square inch above atmospheric pressure in the presence of zinc carbonate.

In testimony whereof, I have hereunto subscribed my name this 21st day of February, 1927.

FREDERICK W. SPERR, JR.